United States Patent
Wookey

[19]

[11] Patent Number: 6,023,507
[45] Date of Patent: Feb. 8, 2000

[54] AUTOMATIC REMOTE COMPUTER MONITORING SYSTEM

[75] Inventor: Michael J. Wookey, Sunnyvale, Calif.

[73] Assignee: Sun Microsystems, Inc., Palo Alto, Calif.

[21] Appl. No.: 08/819,501

[22] Filed: Mar. 17, 1997

[51] Int. Cl.[7] ........................................ H04L 9/00
[52] U.S. Cl. ............................. 380/21; 714/805
[58] Field of Search ................ 380/21; 714/23, 714/25, 712, 735, 805

[56] References Cited

U.S. PATENT DOCUMENTS

| | | | |
|---|---|---|---|
| 4,567,560 | 1/1986 | Polis et al. | 714/23 |
| 5,155,847 | 10/1992 | Kirouac et al. | 395/600 |
| 5,307,354 | 4/1994 | Cramer et al. | 371/11.2 |
| 5,495,610 | 2/1996 | Shing et al. | 395/600 |
| 5,696,486 | 12/1997 | Poliquin et al. | 340/506 |
| 5,726,912 | 3/1998 | Krall, Jr. et al. | 364/550 |
| 5,751,964 | 5/1998 | Ordanic et al. | 395/200.54 |
| 5,908,471 | 6/1999 | Lach et al. | 714/805 |

OTHER PUBLICATIONS

"Remote Systems Diagnostics Installation & User Guide, Remote Systems Monitoring (SunReMon™), Remote Dial-in Analysis (SunRDA™)," Release 1.0.1, Sun Microsystems, Mountain View, California, Nov. 1996, (116 pages).

"Solstice ™ SyMON™ User's Guide," Revision A, Sun Microsystems Computer Company, Mountain View, California, May 1996 (116 pages).

*Primary Examiner*—Salvatore Cangialosi
*Attorney, Agent, or Firm*—Skjerven, Morrill, MacPherson, Franklin & Friel LLP

[57] ABSTRACT

A remote monitoring system automatically communicates system diagnostic information from a monitored computer system to a remote service center at regular intervals. The remote monitoring system includes a plurality of monitored computers at a first location coupled together by a network. One of the monitored computers is a master and others of the monitored computers are slaves coupled to the master. The monitored computers store system diagnostic information resulting from execution of diagnostic programs. The diagnostic information from the slaves is collected at a memory location accessible by the master before the diagnostic information from all of the monitored computers is communicated to the remote monitoring computer at the second location. The remote monitoring computer receives the diagnostic information at predetermined intervals. The received diagnostic information is incorporated into a searchable database.

20 Claims, 9 Drawing Sheets

AUTOMATIC REMOTE COMPUTER MONITORING SYSTEM

CROSS-REFERENCE TO RELATED APPLICATION

This application relates to the following commonly owned co-pending application, Ser. No. 08/819,500, entitled "DYNAMIC TEST UPDATE IN A REMOTE COMPUTER MONITORING SYSTEM", by Michael J. Wookey, filed the same day as the present application and which is incorporated herein by reference now pending.

BACKGROUND OF THE INVENTION

1. Field of the Invention

The invention relates to computer systems and more particularly to remote monitoring of computer systems.

2. Description of the Related Art

Computer systems such as mainframes, minicomputers, workstations and personal computers, experience hardware and software failures that degrade system performance or render the system inoperative. In order to diagnose such failures computer systems include diagnostic capability which provides various types of system diagnostic information. In many instances, when serious problems occur, a support engineer may be required to analyze those problems and to suggest solutions based on the system diagnostic information available.

Since computer systems are frequently located at some distance from the support engineers, when problems do occur, a support engineer may access the computer system remotely through a modem in an interactive manner to evaluate the state of the computer system. That remote dial-in approach does allow the support engineer to provide assistance to a remote customer without the delay of traveling to the computer system site.

A typical remote dial-in sequence begins when a problem occurs on the computer system and the user of that computer system calls the remote service center. A remote support engineer will log into the customer's system over a dial-up telephone line, and perform analysis of the system and of any failures which have occurred. Once connected to the remote computer system, the support engineer can perform such tasks as analyzing hardware and software faults by checking patch status, analyzing message files, checking configurations of add-on hardware, unbundled software, and networking products, uploading patches to the customer system in emergency situations, helping with problematic installs of additional software, running on-line diagnostics to help analyze hardware failures and, copying files to or from customer system as needed.

However, there are limitations to such a remote dial-in service. For instance, the data size transfer may be limited, due to such factors as modem speed. Remote dial-in sessions, which last a long time are more prone to connection failures which could add further delay to bringing the system back on-line. A dial-in service may not be intended for activities which are outside the standard support functions, such as, remote system administration (adding users, installation of software, etc.), long-term system monitoring, transfer of large amounts of data such as Oumbo patches and crash dumps).

Running diagnostic software during the remote session, if necessary, may adversely impact system performance. Where a system is part of a network, which is commonplace today, the running of diagnostic tests may impact network performance. Where computer systems are being used in a production or other realtime environment, such degradation of system performance is obviously undesirable. Also, the remote session requires intervention from the customer to request the remote dial-in. Further, the customer may want to monitor the activity of the support engineer for security or other purposes. Further, a remote dial in service may be dedicated to one machine with a modem rather than a network of machines. Each machine requiring a remote connection might need to have a modem attached which may be undesirable due to limited phone lines or additional security concerns.

Additionally, the remote-dial in service approach generally fails to look at a system until a problem has occurred. Therefore, there is no historical diagnostic data that is available using remote dial-in approach. It is impossible to analyze trends or compare system performance, e.g., before and after a new hardware or software change was made to the system. The support engineer is limited to the snapshot of the system based on the diagnostic information available when the support engineer dials in to the system.

SUMMARY OF THE INVENTION

Accordingly it has been discovered to provide a monitoring system that automatically communicates system diagnostic information from a monitored computer system to a remote service center computer system at a programmable periodic interval. In accordance with the present invention, a remote monitoring system includes a plurality of monitored computers coupled together by a network. One of the monitored computers is a master and others of the monitored computers are slaves coupled to the master. The monitored computers store system diagnostic information resulting from execution of diagnostic programs. The diagnostic information from the slaves is collected at a memory location accessible by the master before the diagnostic information from all of the monitored computers is communicated to the remote monitoring system. The remote monitoring system acquires the diagnostic information at predetermined intervals. The received diagnostic information is incorporated into a database to provide a history of the diagnostic information. The diagnostic information can be searched and analyzed by service center engineers.

The ready availability of diagnostic information, including the historical information, to the service center engineers, can decrease problem resolution time, resulting in increased uptime of customer systems and higher productivity for the service center engineers. A remote monitoring system, according to the invention, can reduce or eliminate required intervention by the customer and the service center both to collect the system diagnostic information, and to process it.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE INVENTION

Figure 1:
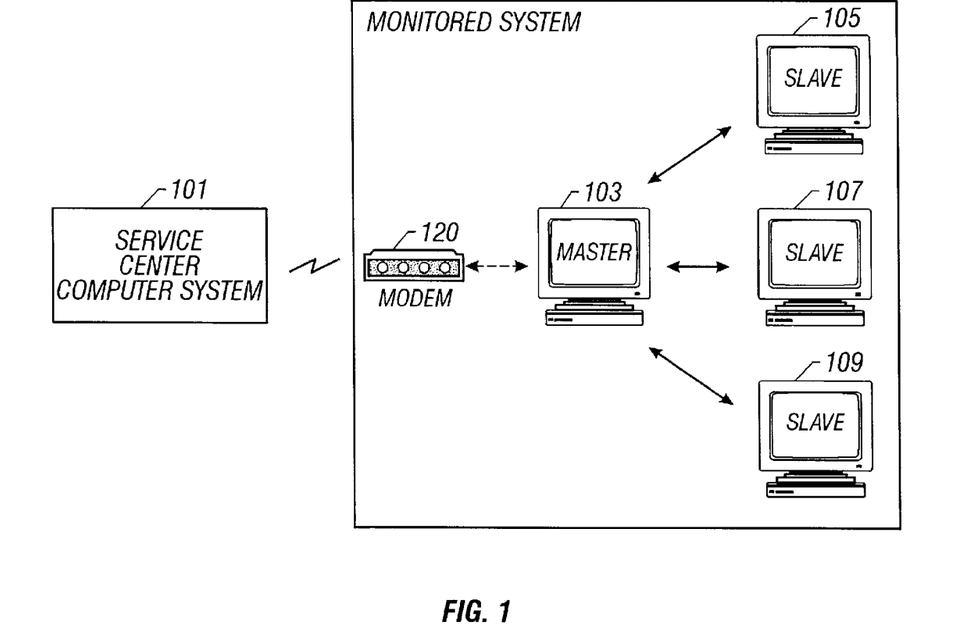
FIG. 1 is a high level diagram of the service center and monitored computer system according to the present invention.

Referring to FIG. 1, an exemplary remote monitoring system according to the present invention includes a monitored system 102 and service center 101 which monitors the monitored system 102. The monitored system 102 may be coupled to service center 101 via modem 120. The monitored system 102 includes one or more masters 103 and slaves 105, 107 and 109. Diagnostic information from diagnostic tests run on the monitored system is communicated from monitored system 102 to the service center computer system 101 where it is stored in a database for use by service center engineers. The communication may be via dial up modem link, email over the internet, RF link or any suitable communication link to provide the diagnostic information from the monitored system to the monitoring system.

Figure 2:
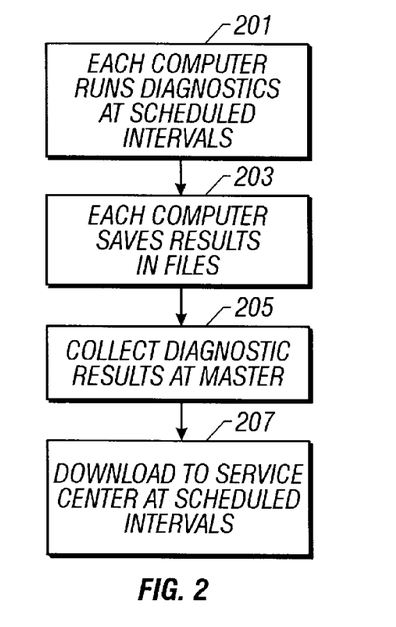
FIG. 2 shows a high level sequence of the actions of the monitored computer system.

Referring to FIG. 2, a high level flow diagram in accordance with one embodiment of the invention is shown. The monitored computers, both slaves and the master(s), run diagnostics at scheduled intervals at 201. Each computer stores the results of those diagnostics at step 203 in log files, which may be local to each computer, e.g., in its own disk drives, or at a storage location in the networked system accessible by each computer. At 205, the saved diagnostic information is collected at a location accessible by the master. In one embodiment, the location is local to the master computer. Finally, at 207, the diagnostic information from all of the computers is communicated to the service center at scheduled intervals.

The diagnostic information collected from the monitored computer system includes, e.g., error messages from log files, system crash data, list of installed patches and revisions, hardware configuration (RAM, disk space, SCSI devices), administrative problems (full disk partitions, low swap space). The diagnostic information is generated using diagnostic tests and monitoring functions which include "modules" running on the monitored system. The modules test or retrieve data related to a specific aspect of the system. If the system is modified through hardware or software changes, thus requiring new tests, or if updated modules are developed for existing aspects of the system, the new modules may be sent to monitored systems from the service center to automatically begin execution.

In one embodiment, service center software accesses the monitored system to collect the diagnostic information at scheduled intervals. The access is initiated according to a scheduler maintained in the service center. Alternatively, access could be initiated by the monitored system. For embodiments in which the internet is used to transmit diagnostic results, the monitored system initiates provision of the diagnostic results without any intervention of the service center.

It may be desirable to reduce the amount of diagnostic information that is transmitted to the service center, so the monitored system can compress the data prior to communication of the diagnostic information to the service center. In one embodiment, a cron job is scheduled to prepare a compressed tar file of the diagnostic information, facilitating communicating the diagnostic information coincident with dial-in (or other access method) by the service center. Processing the diagnostic information, e.g., gathering the diagnostic information into a file accessible for transmission and compressing the diagnostic information, before the communication of the diagnostic information to the service center can reduce modem connect time and therefore may reduce the probability of dropped modem connections. Scheduling communication of the diagnostic information at regular intervals, may reduce or eliminate intervention required by a customer at the monitored computer system or the support engineer at the service center to communicate the diagnostic information.

The collected data is post-processed at the service center, looking for serious problems that have occurred or attempting to recognize any future problems that may occur. This information is then placed into a database in the form of alerts which may be used to trigger other operations (such as email to the service center). Service center engineers will be able to search on the data, getting up-to-date information about the state of the machines in the monitored network, including such information as patch versions applied and disk space constraints.

Figure 3:
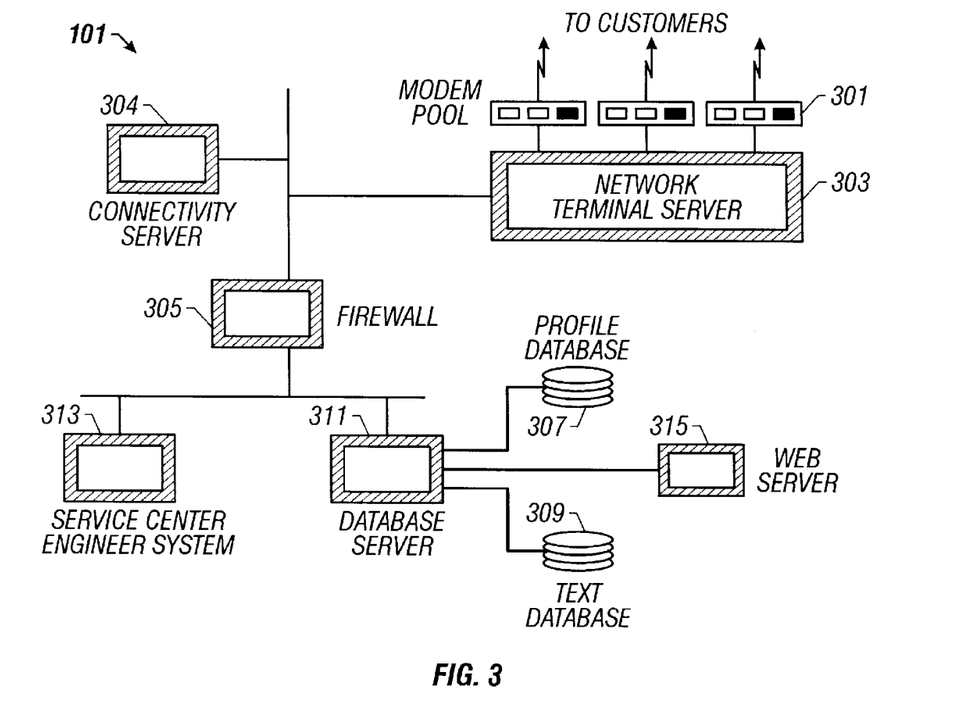
FIG. 3 shows a block diagram of the service center of FIG. 1.

FIG. 3 shows the overall architecture of service center 101 according to one embodiment of the invention. The modems of modem pool 301 connect to modems of the monitored sites under control of a network terminal server 303. The connectivity server 304 provides a software link for communication of data from the modem pool 301 through firewall 305. Firewall 305 provides security against undesired access. The diagnostic information from the monitored computer system is transmitted back to the service center and stored in text data base 309. Text data base 309 is a text indexing data base, such as a text data base provided by Fulcrum Technologies, Inc. which manipulates and searches large amounts of text information, such as the diagnostic test results sent from the monitored computer system. Data base 307 can be any of a number of relational data bases, such as provided by Sybase, Inc., and stores profile information about each customer. For instance, data base 307 stores the hardware and software configuration for each customer, customer name, responsible service engineer and the like. In addition, data base 307 can store product life cycle information, that includes the diagnostic tests and patches that exist for a particular product.

The information stored in data bases 307 and 309 may be retrieved by service center engineers using computer system 313 through database server 311. Additionally, service center engineers at other service centers, may access the information through a web server 315 which provides access to the diagnostic data base to, e.g., service engineers located throughout a company's network.

The database 309 can index diagnostic information received from the monitored system so that it is readily searchable based on parameters that are identified as useful, such as retrieving particular tests, types of tests, or tests on certain computers.

Thus, an exemplary system may provide retrieval of test data based on which computer the test was run. For instance the names of all tests run on a particular computer may be displayed. Tests can also be identified by such information as date and time stamp, the name of the test and, the type of test (e.g., network, system, or unbundled). Actual test results from any particular test can be viewed.

Additionally, an exemplary data base system in the service center may allow retrieval of test data according to the portion of the system being analyzed. These tests can include for example, tests from system areas such as automounter setup (configuration files and maps), automounter status and messages, core file checking and analysis, domain name service (DNS) setup information (configuration files), diagnostic information and replaceable units, disk mirroring information, disk setup information (file systems, nfs and devices), disk status information, kernal tunables, display information (depth/resolution/vendor), domain information, ethernet setup information and, frame buffer information. The exemplary system information given above will vary according to such factors as the type of computer system that is being monitored, the type of software that is being used, the operating system, and the like.

Other typical search capability through the database containing the diagnostic information would include keyword searches to search for a string contained in the database, and sorting test data by time. Because the database keeps previous communications of diagnostic information, the test data can also be sorted by time.

Note that the length of time that test data from any particular monitored system is kept in the database may be limited to, e.g., two weeks, two months, or two years, depending upon the storage capability of the service center system. The storage of test data provides a history of a particular monitored system which can be of significant value in analyzing system problems.

Figure 4:
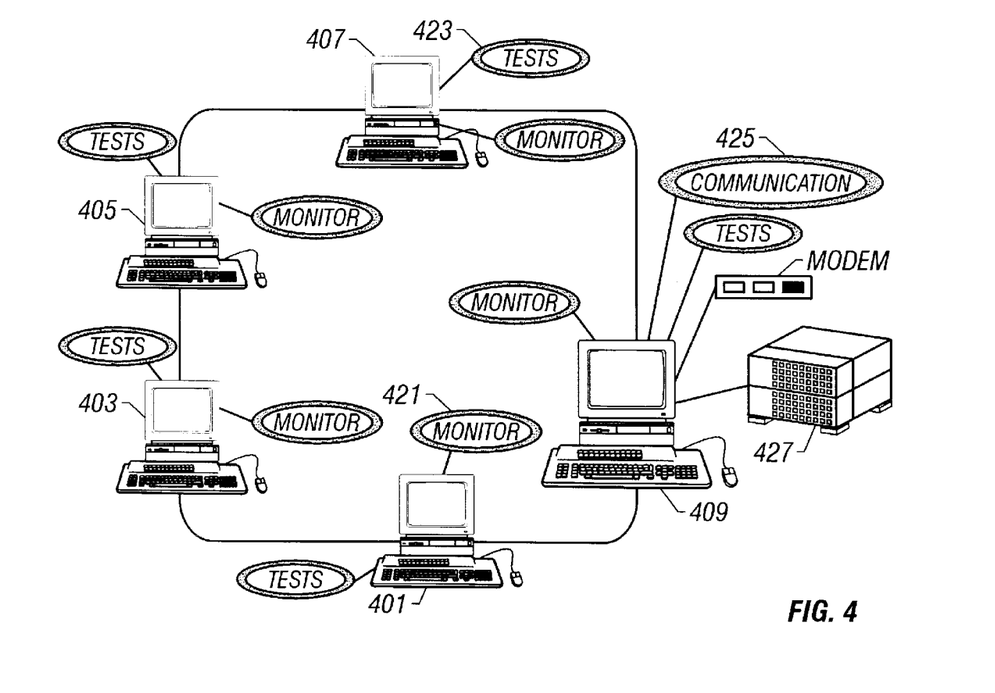
FIG. 4 shows further details of a monitored computer system.

Referring to FIG. 4, additional details of a monitored system according to the present invention are shown. The monitored system includes remote monitoring software. In one embodiment, the remote monitoring software includes the monitor program 421 running on each of the slaves 401–407 and on the master 409. The diagnostic tests 423 also run on each of the computers 401–409. In addition, the remote monitoring software on the monitored system includes an administrator tool, and communications software. Disks 427 are illustrative of the fact that master 409 may be a server machine requiring extra disk storage capability.

The remote monitoring software monitor 421 is the controlling software that runs on each machine to be monitored. It may run all the time in daemon mode, running diagnostics on the machine and filing away the results to be transmitted back to the service center. The monitor provides an interface into the communication software 425 which provides the master with the necessary software for communicating to the remote service center. In one embodiment, when modems are utilized, the communications software will support modem communication to the service center. In other embodiments, the communication software provides, e.g., internet capability.

The monitor, in one embodiment, has the ability to add new tests "on the fly" that have been downloaded from the service center, giving the software remote extensibility. The monitor schedules, executes, and stores the results of diagnostic tests, and is maintained by a simple administrator interface. The monitor monitors such system parameters as disk space and inode usage in the log-writing area to avoid potential problems.

The monitor can run in two modes, either as a master or as a slave. A master provides a link to the service center so diagnostic information from a group of slaves and the master can be communicated to the service center. The monitor also provides intelligent log-copying facilities to copy logs of diagnostic results from slave to master during low network load times, ready for transmission back to the service center and provides system-down monitoring and notification. In a UNIX environment, the kernel, which is the part of the operating system that allocates resources and controls processes maintains information about network load that can be examined by the monitor.

Since security is often a top priority, the monitor program can be configured so that it does not run as root, when, e.g., the monitor is running in a UNIX environment. That ensures that the access of the monitor program to the monitored system is limited.

Figure 5:
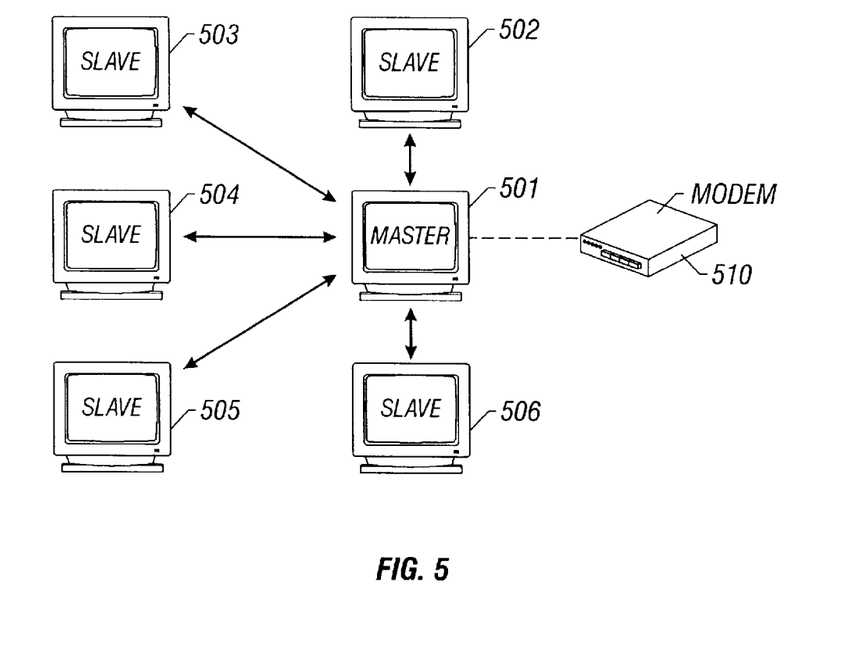
FIG. 5 shows a master/slave configuration for the monitored computers.
Figure 6:
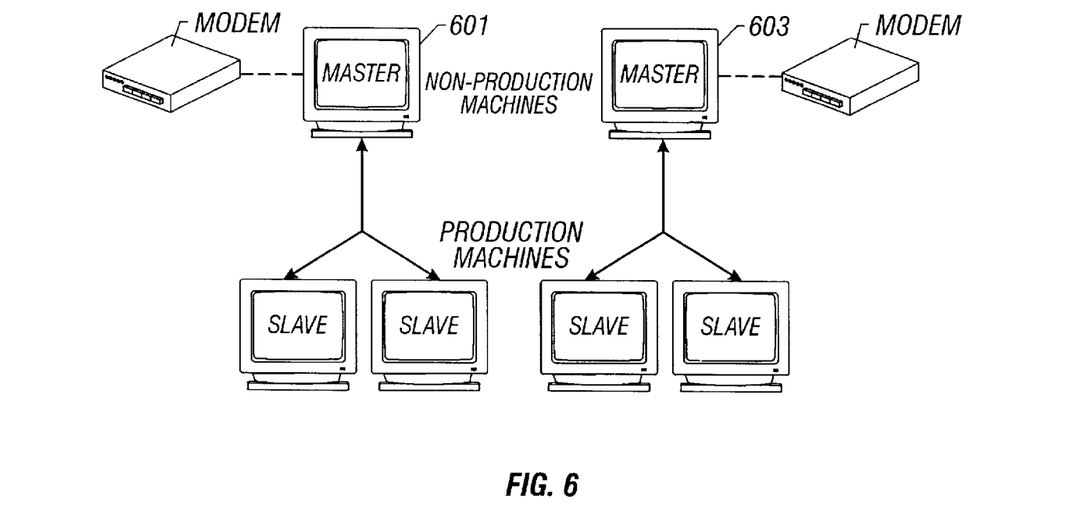
FIG. 6 shows another master/slave configuration for the monitored computers.

Several exemplary master/slave configurations are provided in FIGS. 5 and 6.

For small networks the most stable machines(s) should be chosen to act as masters and the more heavily loaded, less stable machines should be configured as slaves.

FIG. 5 illustrates an installation with just one master 501 and five slaves 502–506. In this configuration, all systems (including the master) can be production machines. The master is chosen for its expected maximum uptime. The master gathers (or is sent, or both), log files from all six systems, which are transmitted together at each scheduled data download to the service center.

On larger networks, particularly ones with time-critical application systems running on many production machines, the most important consideration is likely to be maximum uptime. A system according to the present invention effectively serves the purpose of maintaining high availability, if the allocation of masters and slaves is efficiently assigned. Referring to FIG. 6, the configuration is similar to the one shown in FIG. 5, except that the master 601 should not be a full production machine. Rather, master 601 should be a dedicated (or semi-dedicated) system whose main purpose is to be the monitor master for a number of production machine slaves. Also there may be multiple dedicated masters 601 and 603, depending on the number of production slaves being monitored. Such a configuration ensures a high level of uptime monitoring, since the master is immediately informed as soon as any of its slaves goes down.

The master monitor has a communications gateway 510 to the service center, such as a modem, associated with it. The master collects the diagnostic information which has been collected by the slaves, and communicates that collected diagnostic information to the service center. In addition, the master monitor can provide automatic starting of its slave monitors. The master monitor also may provide email notification of severe problems with the monitor, to, e.g., a system administrator. Note that the "system administrator" is the person that is responsible for the customer system while the "administrator" is a part of the monitor software.

The master maintains a list of all its slaves, and can attempt to autostart them if they go down via a remote procedure call (RPC). The master provides monitor down notification if any slaves associated with that master go down. That notification can be communicated to the service center, on a regularly scheduled transmission of diagnostic information to the remote monitoring computer system or the master can use non-scheduled communications.

A slave monitor is bound to a single master, and its collected data is sent to the service center via the master. Thus, a slave does not require a communication gateway of its own. A slave can exist on a network independently, as long as the slave can communicate with its master. Thus, external access for each computer on the network is not necessary. A slave may check on a master periodically. If a slave notices that a master is down, a slave may also send email to a predetermined address, e.g., to the system administrator or to an email address of the service center if available.

The configuration of the monitored system should try to account for how the product's work load will be distributed across the monitored computer system. Considerations include how many and which machines should be configured as master monitors. Also considered is the number of slaves per master and which slaves should be assigned to which master. There is no particular limit to the number of masters and slaves that may be installed but certain considerations may limit the number of masters and the number of slaves per master. For instance, a modem or other communication gateway is installed on any machine which is configured as a master. The use of slaves reduces the need for multiple modems and multiple phone lines.

The choice of which machines to choose as a master is also important. More heavily used machines are generally less stable, i.e. they more prone to downtime. Machines with lighter loads may make better masters. In any case, one embodiment of the invention provides the capability to modify the monitored site's master/slave configuration after the installation should also be provided.

Master/slave configurations are typically hard-bound, one-to-one relationships that is, a slave can normally have only one master although it would be possible to provide for, e.g., backup masters. Although a master can have numerous slaves, no slaves are "shared" with other masters. The more slaves that a master has, the more data per master. Each machine (whether master or slave) generates log files containing diagnostic information which are included in the periodic communications to the service center. The number of such periodic communications should be increased when a larger number of slaves are on a single master, to decrease the quantity of data per download. For this reason, it may be important to maintain limits on number of slaves per master. For instance, in one embodiment, the maximum number of slaves for a single master is 20. In general, performance can improve with fewer slaves per master.

In one embodiment, three file locations may be designated in the remote monitoring software on the monitored system for each of the monitored computers. One file location contains all of the application binaries and static support files A second file location is a dynamic data area and is used to store the outgoing log information containing the diagnostic information generated by the monitors. Enough space should be allocated to the outgoing log information area to support the type and frequency of the diagnostic tests that are being run. A third file location stores local files specific to machine installation, e.g., the schedule of tests to run on that specific machine.

When a monitor executes a diagnostic test, it traps the output from the test. The test output information may first be stored in a temporary file in the dynamic data area. If there is no communications lock, the diagnostic information can then moved into a more permanent location in the dynamic data area. A communications lock may be put in place when the log information is being communicated to the service center. The communications lock prevents new information from overwriting the information currently being communicated to the service center, while still retaining the new information.

In a master/slave scenario according to one embodiment of the invention, once the slave has written its diagnostic results into its log directory, the slave looks for a time of network bandwidth availability before copying its information to the master. That method avoids the bandwidth impact of a master requesting all the diagnostic logs from its supported slaves at scheduled download times to the service center, e.g. when the service center dials in requesting data. Alternative methods of data assembly for downloading to the service center are also possible. For instance, the master could come and collect data from the dynamic data area allocated to each slave during times of low network load, the slave could save results directly into an area accessible to the master. Combinations of any or all of the techniques of getting the data to the master are possible.

As mentioned previously, the monitor utilizes an administrator tool to manage such tasks as test scheduling and execution. According to one embodiment of the invention, the administrator is a Graphical User Interface (GUI)-based tool that communicates (via remote procedure calls (RPC) and network services) with all of the monitors that exist on a subnet, i.e., one master/slave group. An RPC is a common protocol for implementing the client-server model of distributed computing, in which a request is sent to a remote system to execute a designated procedure, and the result is returned to the caller. Thus, all monitors in a subnet can be viewed with an administrator. It is possible to protect each monitor with a unique password so that only authorized administrative personnel can access a given monitor for modification. If the capability is provided to administer all the monitors from a single administrator, administrative responsibility can be allocated across a subnet. Alternatively, each monitor program could have an administrator tool that only accesses that specific monitor. Or, only a designated monitor or monitors, e.g., a master, could have the administrator tool.

The administrator provides two modes of operation, monitor mode, to view all monitors on a network and edit mode, to edit a specific monitor. The administrator allows configuration of the monitor software. For example, the administrator controls data communication scheduling (i.e. downloading the diagnostic information to the service center) and other communication parameters on master monitors, e.g., the time of day the service center will be able to dial in to collect the data. The administrator can create and modify new diagnostic test schemas on each monitor program. A test schema is a collection of diagnostic tests, together with status information indicating whether they are disabled or enabled and when they are scheduled to run. Typically, only one schema can be run by a single monitor at any one time. The monitor mode and edit mode of the Administrator will be discussed further herein.

The third major block of the remote monitoring software is the communications software. It performs all communication between the service center and the monitored system. In one embodiment, communications are always initiated from the service center. The communications program may be initialized by logging onto the master machine as the user name designated in the monitor software. In one embodiment, the user name may be installed during a master monitor installation, and provides a gateway into the machine.

Another feature of the remote monitoring system that can be of varying importance depending upon the system being monitored, is to maintain system security. There are a number of security measures that can be used to try to ensure that no unauthorized connection is made. For instance, the security features may include secure dial-back modem capability to reduce the possibility of unauthorized access to the monitored computer.

Another security feature may be to limit access to the monitored computer system by the remote service center. Therefore the communication software may provide no functionality other than gathering collected system data for communicating to the service center. Limiting functionality to gathering data means that it is difficult to break into the monitored system to execute commands, view files, or have other access other systems on the customer's network. In one embodiment of the invention, when the monitored system operates in a UNIX environment, automatic non-root login with no interactive shell helps ensure that the limited capability provided by the communication software limits access to the customer system.

Figure 7:
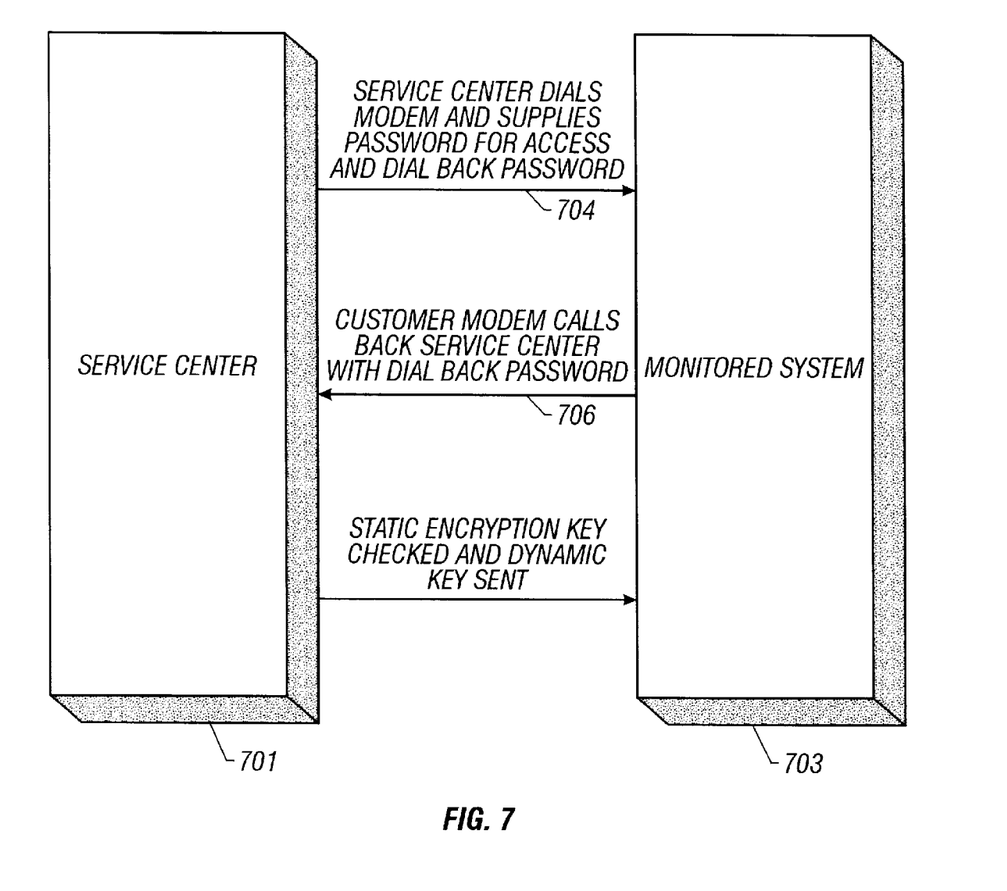
FIG. 7 shows a connection sequence when dial back modem and encryption keys are used to communicate the diagnostic information from the monitored computers to the service center.

In one embodiment of the invention, a secure dial-back modem, such as a MultiTech MT2834 series modem, is used to at the monitored system to communicate with the remote computer system at the service center. When the remote monitoring system is installed, the secure dial-back modem is programmed with the incoming modem line phone number of the service center. FIG. 7 illustrates a secure dial-back sequence between the service center and the monitored system. The sequence begins at 704 where the service center 701 dials the monitored system's modem. The modem at the customer is password protected and the password is supplied by the service center. The service center then provides a second dial back password. The dial-back password corresponds to the modem phone number for the designated service center. That modem number may be programmed into the modem PROM by software. Preferably, the secure dial-back modem is configured to limit connection attempts, e.g., permit only two attempts, before automatic disconnect. The connection is then broken. The modem at the monitored system then dials back the service center as shown at 706.

At this point, only the modem communications are activated. Once the connection is initialized, the communications software logs into the master computer and attempts to verify the communications software agent. Verification is done in three phases. In the first phase both ends of the communications software validate that they are the same version of the software. The second phase is to check a static key. The communications agent (on the monitored system side) has an encrypted static key installed in it. The service center communications software sends the decrypt bits and checks the key. In the third phase, the service center communications software sends to the monitored system's communication agent a dynamic session key, which is decrypted inside the agent and stored.

At this point, communication is established and diagnostic data can be transferred to the service center. During the initialization of the session, all the communication is encrypted against the static key and the decrypt bits. That is typically only a small amount of data. Once the dynamic key is authorized, all of the subsequent data is encrypted on, e.g., a 16-bit basis using the dynamic key, or using a byte swapping algorithm or any of many other encryption techniques known tin the art, selected according the level of security desired.

Preferably, the "Remote Configuration" feature of the secure dial-back modem has been disabled, so there is no way anyone could remotely re-configure the secure dial-back modem for another call attempt; this can only be done locally. With the dial-back security scheme the monitored system is protected. Even if all passwords were compromised, the secure dial-back modem would dial the Service center instead of someone trying to break in. That call to the service center would then be ignored due to the unexpected nature of the call or could be further investigated to determine what caused the unexpected call.

The embodiment just described has a relatively high level of security. Other embodiments may require less security. For instance, encryption may not be used at all, and a regular modem connection may suffice. Also, it may be possible to send the data over the internet rather than have a dial-up link. Data could be sent over the internet as encrypted data or without encryption if security is of no concern. If the diagnostic information is sent over the internet, the transfer of diagnostic information could be done entirely by the monitored system without the interaction of the service center until the service center receives the data.

Many other communication possibilities exist. For instance, there may be dedicated telephone lines or other direct link between the monitored computer system and the service center. Another possible communication link would be an radio frequency (RF) link, the RF link typically requiring encryption to provide security.

An additional security feature is to have only a single point of access to a subnet during downloads from the monitored system to the service center. The diagnostic information collected on all of the monitored computers is copied to the master server (the system on the network with the modem or communication gateway) on a continuous basis. The data is stored in the master in an "outgoing" directory. When the service center dials into the monitored system to initiate the data transfer, information is gathered from this outgoing directory only. The remote monitoring dial-in never directly accesses any other directories or monitored systems on the customer network.

When the downloaded data reaches the Service center database, it is preferable that it be protected by a login/password system. Only service center engineers should have access to information from the monitored systems. As a further security measure, modem and environment data may be protected in a separate database. For instance, information about the monitored site (modem phone numbers, modem passwords, etc.) may only provided to those who "need to know." That information can be secured with its own login/password system, so only authorized administrative personnel access it.

In one embodiment, the communications software provides the remote monitoring computer system (i.e., the service center) with remote access to certain areas of the monitored system to copy files to, copy files from, or execute commands in the customer machine. It may be preferable to limit service center access so that files can only be copied into one incoming directory. Secondly, the communication software can copy a file from the monitored system. Again, the communication software could be restricted to copy files only from one outgoing directory. Thirdly, the communications software can execute a remote command. The software may be restricted in that it can only execute commands from a particular incoming directory. Those commands may run, in certain embodiments, with limited privileges.

There may be occasional need for transferring files to or from the Service center which are not located in the areas authorized for remote access (as described above). Therefore convenient programs may be provided to copy files into the outgoing directory, from which the service center can access it for transfer. It may also be necessary to move a file from the incoming directory where the Service center has transferred the file for customer retrieval into another directory not accessible by the service center. The remote monitoring software may include such capabilities.

Another component of the remote monitoring system is the diagnostic tests (shown as 423 in FIG. 4) which are the modules that gather information on monitor machines and store the information in log files for transferring to the service center. The administrator provides user control over which tests are executed, and how often they are executed.

Table 1 provides an exemplary list of diagnostic tests for use with Sun Microsystem computers. The tests used in any particular embodiment of the invention will depend on the types of computer systems being monitored by the operating system being utilized, and the hardware and software installed. The tests may be organized into three categories of class: network tests, OS (operating system) tests, and unbundled (unbundled product) tests.

TABLE 1

| Class | Test Name | Description |
|---|---|---|
| network | automount.files | Automount/etc Files |
| | automount.nis+ | Automount NIS+ Files |
| | automount.nis | Automount NIS Files |
| | dfshares | NFS shared filesystems |
| | domainname | Domain name |
| | etc.defaultdomain | /etc/defaultdomain |
| | etc.defaultrouter | /etc/defaultrouter |
| | etc.dfstab | List/etc/dfs/dfstab |
| | etc.hostnames | /etc/hostname(s) |
| | etc.hosts | /etc/hosts |
| | etc.mnttab | List/etc/mnttab |
| | etc.named.boot | /etc/named.boot |
| | etc.nsswitch.conf | /etc/nsswitch.conf |
| | etc.resolv.conf | /etc/resolv.conf |
| | netstat-an | List all TCP connections |
| | netstat-in | List network interfaces |
| | netstat-k | Network interface low-level statistics |
| | netstat-rn | List network routing table |
| | nisdefaults | NIS+ server defaults |
| | nisstat | NIS+ statistics |
| | ypwhich | NIS server name |
| | ypwhich-m | NIS map information |
| OS | checkcore | Check for core files |
| | df | Disk Usage |
| | dmesg | Boot Messages |
| | framebuffer | Default console/framebuffer |
| | hostid | Numeric ID of host |
| | ifconfig | Ethernet/IP configuration |
| | messages | System messages (/var/adm/messages) |
| | patches | List system patches |
| | pkginfo | Software package information |
| | prtconf | System hardware configuration (Software Nodes) |
| | prtconf-p | System hardware configuration (PROM Nodes) |
| | prtdiag | Print diagnostics |

TABLE 1-continued

| Class | Test Name | Description |
|---|---|---|
| | | (Sun-4d systems only) |
| | sar | System activity reporter |
| | share | Shared directories |
| | showrev | Machine and software revision information |
| | swap | Swap report |
| | uptime | Local uptime and load average |
| | whatami | Lengthy system description report |
| unbundled | fddi-nf_stat | FDDI low-level statistics |
| | metastat | Online DiskSuite or Solstice DiskSuite |
| | vxprint | Systems using SPARCstorage Array Volume Manager |
| | x25_stat | X.25 low-level statistics |

Rather than provide remote monitoring software for each machine, some or all of the software can be shared on a network by some or all of the machines. For example, the remote monitoring software installed on one machine can be shared with other machines via Network File System (NFS) mounts. An NFS mount is a network-based attachment of a remote file system to a local mount point, making the remote file system as available and useable as a local file system. An installed software product can be shared among multiple machines by NFS-mounting the directory in which it is installed. The drawback of this method, however, is that the single machine becomes a "single point of failure"—if that system goes down, all other systems which share its software will not be able to continue running remote monitoring software. Therefore, it may be better to install remote monitoring software on multiple machines, to minimize the problem if any single machine goes down.

The selection of which diagnostic tests to run on each monitor and how often, affects the amount of data generated. To promote efficient performance, the size of the master log directory may be limited. That directory contains the diagnostic test data gathered from the master and all of its slaves between data downloads to the service center. If the size limit on this directory is reached, the master may signal its slaves to stop logging test results, and the system administrator (not the administrator tool) could be notified via email that testing has stopped. Alternatively, once the master log directory could be updated with the newer results so that the older diagnostic results are overwritten.

If the system instructs the slaves to stop logging test data, the test data on the master should be transferred to the service center to clear the system before testing can resume. The next data transfer will empty the master's data area and cause the master and its slaves to resume logging new test data. At this time the administrator may be notified via email that testing has resumed.

Note that the stopping of tests, and the subsequent resumption of tests when the next data download occurs, may take place before the administrator notices the email messages (for example, during off hours). If overloads do occur in the system, it may indicate that steps should be taken such as decreasing the number of slaves per master, decreasing number or frequency of diagnostic tests run, increasing the frequency of regularly scheduled data transfers to the service center, adding a new master, and adjust the master-to-slave ratio.

The quantity of data in the regularly scheduled data downloads is unpredictable. It depends on many interrelated factors, including transfer frequency—the less often transfers are run, the greater the amount of data is generated per transfer; number of slaves/master—the greater the number of slaves for a single master monitor, the greater the quantity of accumulated data that is included in each transfer; quantity of scheduled diagnostic tests—the more tests are run, the more data is generated; frequency of scheduled diagnostic tests—the more often scheduled tests are run, the more data is generated; number of problems found on machines—if remote monitoring software locates trouble spots on any machine(s), more data is generated; success of connections to service center if a modem is utilized.

As previously discussed, the administrator can be divided into a monitor mode and an edit mode. In monitor mode, the administrator indicates which monitors are known to be on the subnet. Upon start up, the administrator performs a monitor scan, broadcasting across the subnet, searching for any monitors that may exist. The monitors can be displayed, indicating which of the monitors are masters and which are slaves.

In one embodiment, monitor rescans are network broadcasts performed with the User Datagram Protocol (UDP) Internet protocol which is a transport protocol in the Internet suite of protocols. This protocol provides a procedure for application programs to send messages to other programs with a minimum of protocol mechanism. UDP, like transfer control protocol (TCP), uses internet protocol (IP) for delivery; however, unlike TCP, UDP provides for exchange of datagrams without acknowledgments or guaranteed delivery. UDP is not guaranteed to catch every monitor on every broadcast. However, frequently repeated broadcasts may add to network traffic and therefore should be limited.

Figure 8:
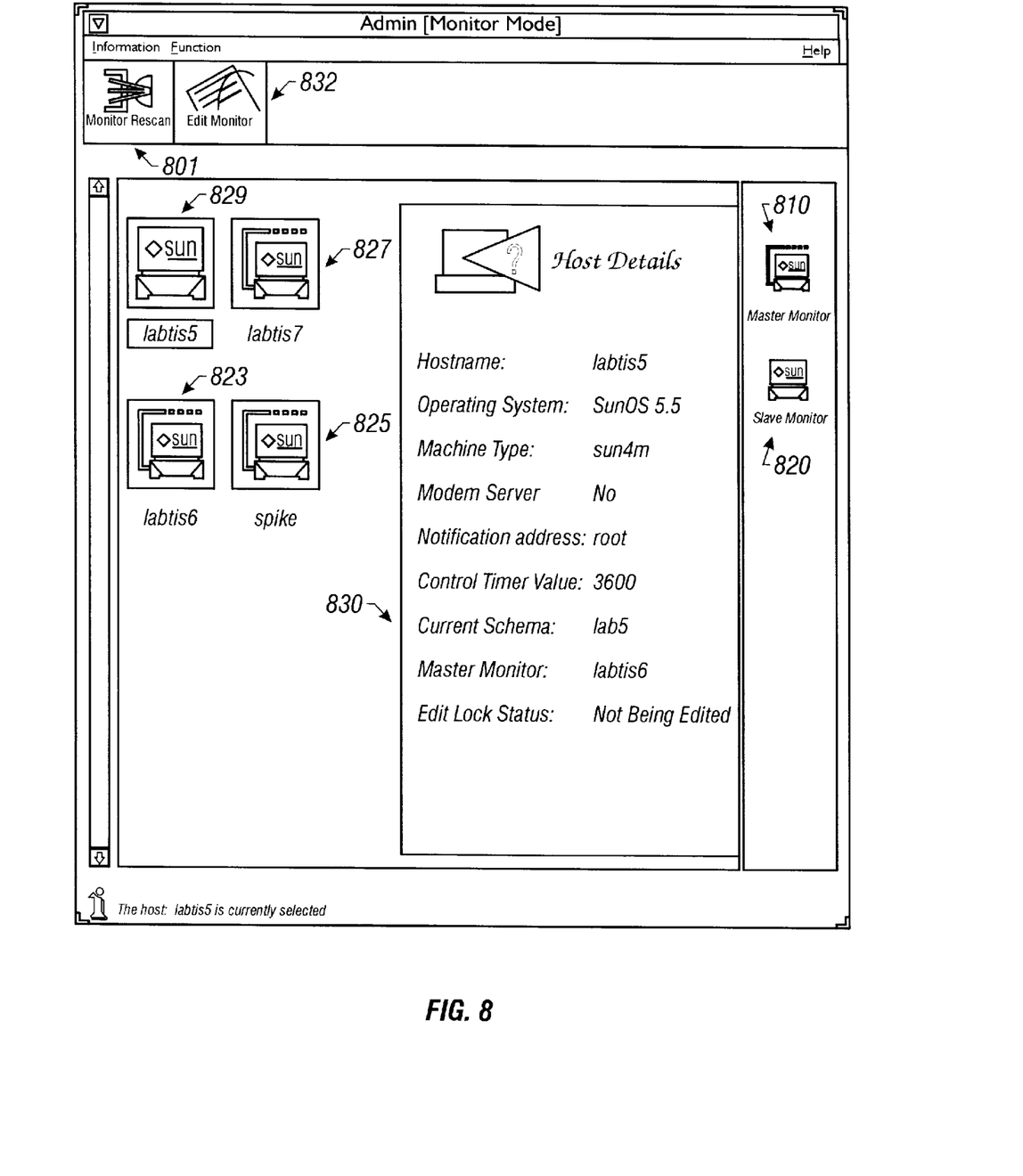
FIG. 8 shows a screen from a graphical user interface (GUI) of the monitor mode of the administrator software.

Referring to FIG. 8, an exemplary graphical user interface (GUI) screen of the administrator program is shown. The host details area 830 provides specific information about the currently selected monitor, including Current Schema (which is the current diagnostic test schema that is being used) and Edit Lock Status (whether the monitor is already being edited by another administrator). Other details include which monitor is the master (if the selected monitor is a slave), the number of slaves (if the selected monitor is a master).

The second major administrator mode is edit mode which can be accessed from the exemplary screen shown in FIG. 8 by, e.g., double-clicking on one of monitors icons 823–829, or clicking on the edit monitor button 832. The edit mode allows editing of selected monitor features. If password protection is provided for each monitor, a monitor password window prompts for the password.

When an administrator goes into edit mode, it can present the user with a list of diagnostic tests that are in the test schema currently running on the selected monitor. The edit mode allows creation of a test schema by selectively enabling tests and scheduling those selectively enabled tests.

When a selected monitor's tests are displayed in the administrator, an editing lock can be created for that monitor, preventing any other attempts to edit the monitor's test schemas from another administrator. Default test schemas may be provided for a new monitor. For instance, three read test schemas, high, medium and low may be available upon initial installation of remote monitoring software. The high schema gets the most information out of a system by running all of the tests frequently, but it can put a higher load on the machine. The medium schema can run fewer tests or runs all of the tests on a system, but at much less frequent intervals, or a combination of fewer tests run at less frequent intervals, to put a lower load on the machine. The low schema puts the lowest load on the machine, by e.g., only running the key tests at much less frequent intervals. The default schemas may be "read only" if the monitor does not allow editing of the default schemas. The default schemas may provide, instead, a variety of starting points from which customized schemas can be created.

Figure 9:
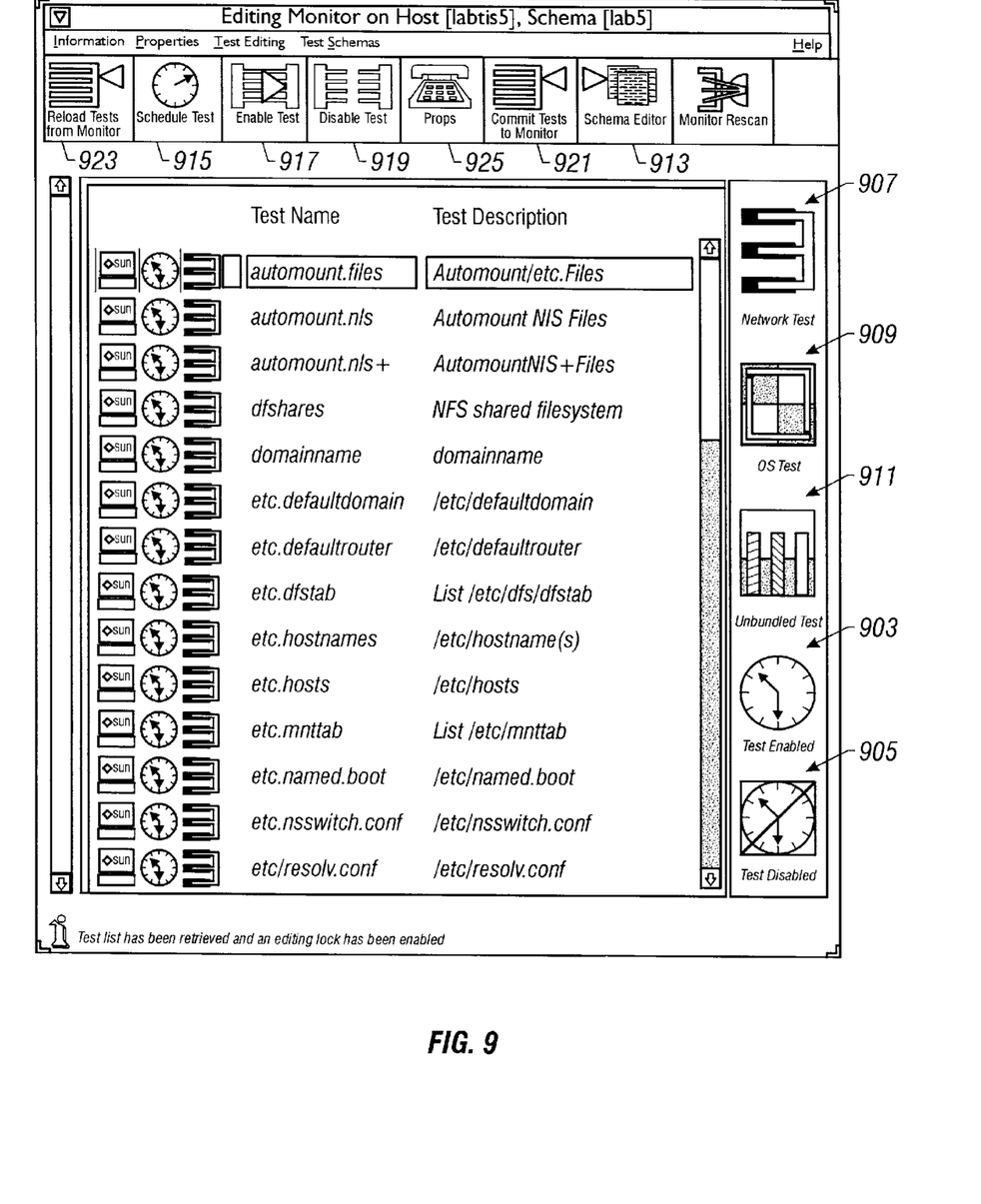
FIG. 9 shows a GUI screen of the editor mode of the administrator software.

Referring to FIG. 9, another exemplary screen of the administrator GUI is shown, illustrating a typical edit mode view of a monitor with an existing custom schema, as shown in the "schema [lab5]" message in the title bar. The edit mode can indicate the enabled/disabled status of a test, e.g. as shown at 903 and 905. Additionally, the edite mode can indicate the type of test, e.g., network tests 907, OS tests 909, and unbundled tests 909.

When a selected monitor's current schema is called up for editing, the administrator can use an editing lock on that monitor. That may be necessary in embodiments in which an administrator can access and edit test schemas on other monitors. If the administrator only edits a local working copy of the schema, the editing lock prevents multiple working copies at different administrators being sent back to the monitor, causing conflicts of scheduling information.

When the administrator is returned to monitor mode (e.g., by performing a monitor rescan), this editing lock is removed. Editing locks can time out. If the administrator is left with unsaved changes for the timeout period of e.g., one hour, the administrator can revert back to monitor mode, clearing the lock. All uncommitted changes will be lost if this occurs.

Figure 10:
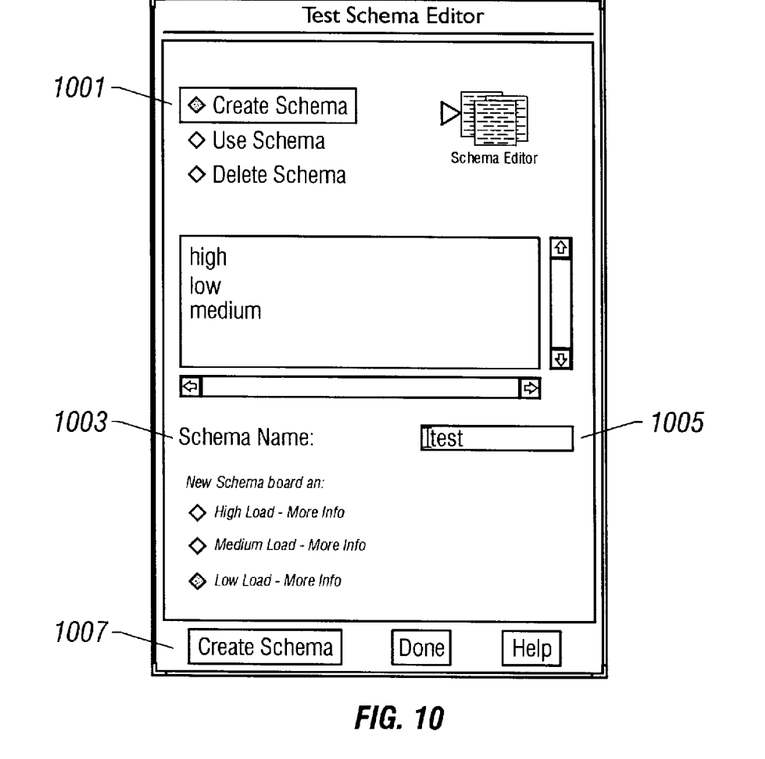
FIG. 10 shows a test schema editor screen from the administrator software.

The schema editor allows the creation, changing, and deletion of test schemas. The editor can be used to create a new custom schema, and to alter a current schema on a selected monitor. The schema editor can be invoked by either a Schema Editor button 913 at the top of the tool window, or the Schema Editor command from a pulldown menu. If the three Read Only schemas are not adequate for a particular system, a new custom schema must be created. Referring to FIG. 10, an exemplary screen showing a test schema editor includes the create schema radio button 1001. The created schema can be based on a selected read only schema (high, medium or low) on which to base the new schema. A name field 1005 provides for the new schema's name. Button 1007 at the bottom of the Editor window can be used to create a new schema.

Once the schema is created, the administrator tool switches to use the new schema, enabling the editing functions as it does so. Referring back to FIG. 9, any selected diagnostic test can be scheduled, enabled, or disabled in the administrator using the schedule test button 915, enable test button 917, and disable test button 919 along the top of the tool window which can all have their counterparts as commands in a test editing pulldown menu.

The commit tests to monitor button 921 (and Commit Tests to monitor menu command) send schema modifications to the selected monitor and start the newly modified schema running. As mentioned earlier, all schema modifications made in the administrator may be made on a local working copy of the selected monitor's schema and if so, any changes will not take effect on the selected monitor until they are sent to the monitor with the Commit Tests to monitor command.

If at any time during modifications of the local working copy of the schema, it is decided to discard changes and start over, the currently active schema can be reloaded from the monitor, and all changes will be erased from the working copy.

If the test schema is reloaded from the monitor (or fresh monitor Rescan is performed) after having applied uncommitted scheduling changes to the local working copy, a prompt can be used to ask the user to confirm the loss of this data.

Scheduling a diagnostic test involves the use of the schedule editor. The schedule editor provides control over how often an enabled test is run on the selected monitor. The schedule editor can be invoked on the exemplary GUI screen is invoked by the Schedule Test button 915 or a Schedule Test command from the Test Editing pulldown menu.

In configuring test schedules, it is prudent to avoid having too many tests scheduled to run at the exact same time, to avoid affecting overall performance of the tests and the machine on which they run. That can be accomplished by staggering tests throughout the day, allowing a useful interval between test repetitions while avoiding concurrency to the extent possible. The default read only schemas can be configured in this way, so customized schemas based on the read only schemas will also have staggered scheduling.

Figure 11:
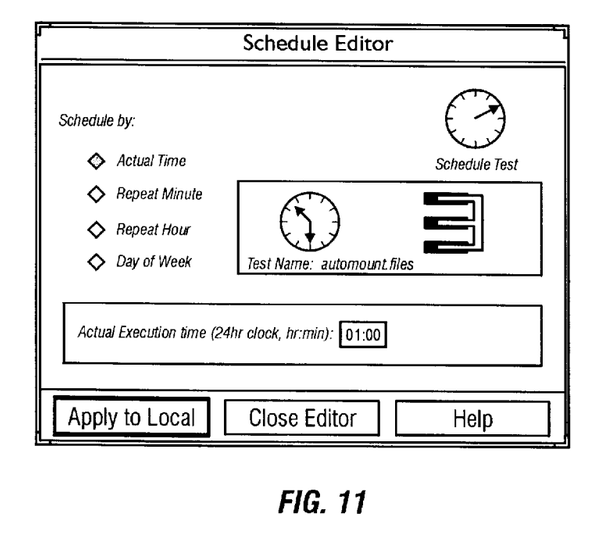
FIG. 11 shows a schedule editor screen of the administrator software for enabling tests to run at an absolute time.
Figure 12:
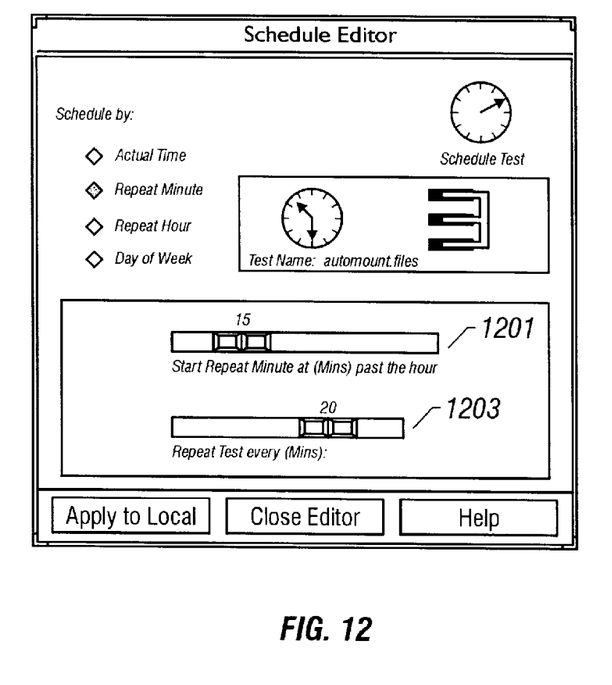
FIG. 12 shows a schedule editor screen of the administrator software for setting tests according to the minute.

Test schedules can be modified and controlled with the following schedule editor formats. Exemplary features of a schedule editor are shown in FIGS. 11–15. In FIG. 11, a test can be set to run at an actual time, e.g., at 1:00 AM. A test can also be repeated every n minutes as shown in FIG. 12. Slide bar 1201 determines the number of minutes past the hour (from 0 to 59) at which the hourly repeat cycle is to be started. The second slide bar, 1203 controls the interval in minutes (from 1 to 30) between repetitions. Using these two settings, virtually any test schedule desired can be arranged. For example, FIG. 12 illustrates a test schedule that will run every 20 minutes, starting at 15 minutes past the hour. The result is that the test will run at 15, 35, and 55 minutes past the hour, every hour. The most appropriate choice for a test interval is any number of minutes that will evenly divide the hour (1, 2, 3, 4, 5, 6, 10, 12, 15, 20, or 30). Other intervals might create uneven test periods and consequently misleading data.

Figure 13:
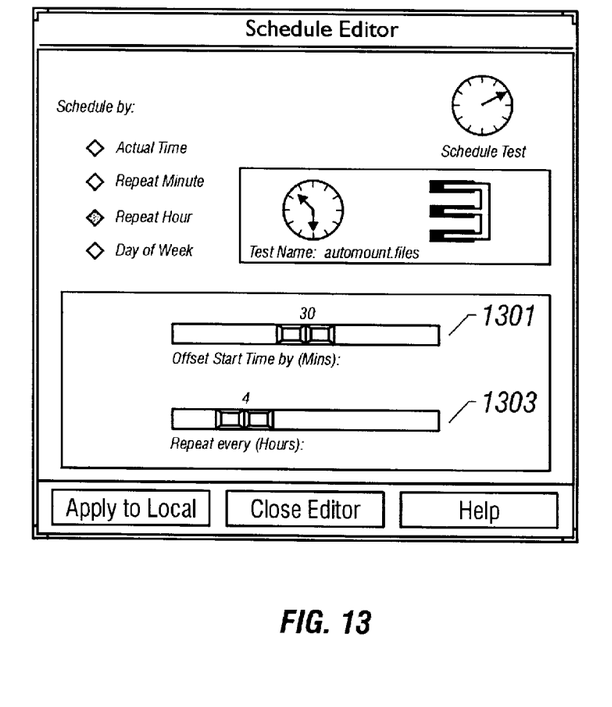
FIG. 13 shows a schedule editor screen of the administrator software for setting tests according to the hour.

For intervals greater than 30 minutes, it is necessary to go to another scheduler (Repeat Hour) shown in FIG. 13. For a repeat hour format a test is repeated every n hours. Again, two slide bars are used to configure the test schedule. The first slide bar 1301 sets the number of minutes past the hour (from 0 to 59) at which the daily repeat cycle is to be started. The second slide bar 1303 sets the interval in hours (from 1 to 12) between repetitions. FIG. 13 illustrates a test schedule that will run every 4 hours, starting at 30 minutes past the hour. The result is that the test will run at 00:30, 04:30, 08:30, 12:30, 16:30, and 20:30, every day. The most appropriate choice for a test interval is any number of hours that will evenly divide the day (1, 2, 3, 4, 6, 8, or 12). Other intervals will create uneven test periods and consequently misleading data. For intervals greater than 12 hours, use the Actual Time format.

Figure 14:
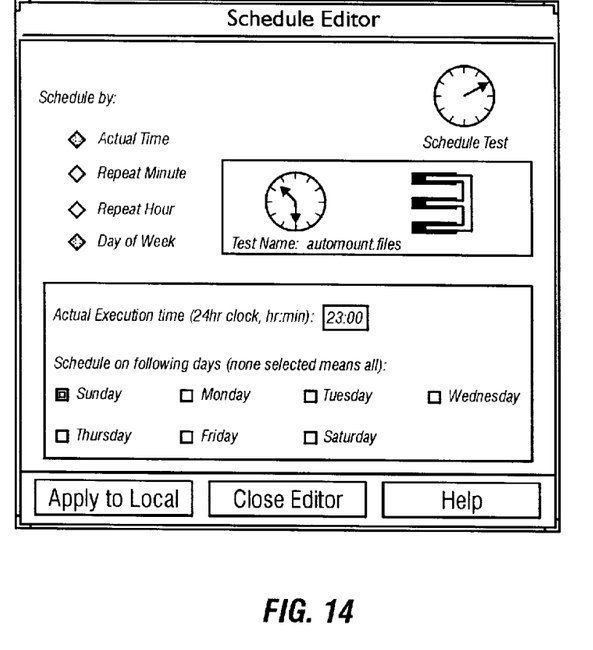
FIG. 14 shows a schedule editor screen of the administrator software for setting tests according to the day of the week.
Figure 15:
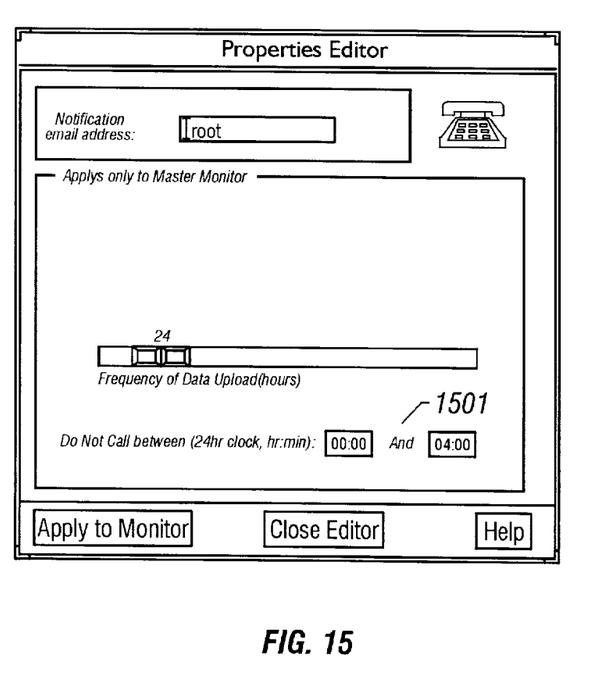
FIG. 15 shows a properties editor screen of the administrator software for setting the frequency of data uploads from the monitored system to the service center.

Further scheduling capability, e.g., day of the week, can be provided. Such capability can be provided with actual time, repeat minutes or repeat hours capability. Referring to FIG. 14 an example of combining Day of Week with Actual Time is shown. In the example of FIG. 14, the test is scheduled to run only at 11:00 PM (23:00) on Sunday nights.

Once the schedule for the selected test has been changed satisfactorily, it is applied to the local working copy of the running schema with the Apply to Local command button. Note again that this has no effect on the actual monitor until the Commit Tests to monitor command has been executed, sending all schema modifications back to the monitor.

The properties of the selected monitor may also be accessed from the Administrator in edit mode, using the Properties Editor. The Properties Editor is invoked by Props button 925 (in FIG. 9) or the General Properties command from the Properties pulldown menu. The properties that can be set in the Properties Editor include for both master and slave monitors, the notification email address which is the address to which all email is sent (errors, generated reports, etc.). The monitor password for the administrator on this monitor only can also be set. In addition, a Control Timer Value (seconds), which is the maximum interval, in seconds, between communications between master and slave. This value can be set anywhere in the range between 10 minutes and 90 minutes, with a default setting of 1 hour.

On a master, the Control Timer Value interval determines (a) how often the master checks to see if any of its slaves are down, and (b) the maximum time the master will wait before it retrieves test data from its slaves. The master ordinarily looks for times of slow network traffic to request slave data, but will not wait any longer than the Control Timer Value setting. On a slave, the interval determines how often the slave checks that its master is still up. If a slave's master goes down, the slave will send email to the notification address.

For master monitors the properties editor can set the frequency of data transmissions (hours) which is the interval, in hours, between transmissions of data from the master to the Service center. In addition, a field 1501 specifies time periods during which modem connections from the Service center are disallowed. As an example, the Properties Editor window shown in FIG. 15 indicates that the monitor is a master with notification email address of root; it should be called up every 24 hours, but not between the hours of 12 midnight and 4 AM. The service center receives data that is included in the diagnostic data that specifying the frequency of data transmission so that the service center can know when to initiate communication in embodiments in which the service center does initiate communications.

For other embodiments in which other communication schemes are utilized, e.g., if encrypted data is sent over the internet, other menus options may be necessary. For instance, the appropriate internet address may be one field that is entered along with times that the data should be emailed.

The description of the invention set forth herein is illustrative, and is not intended to limit the scope of the invention as set forth in the following claims. For instance, while exemplary embodiments were described in terms computers operating in a UNIX environment, the invention is also applicable to various computers utilizing other operating systems. In light of the full scope of equivalence of the following claims, variations and modifications of the embodiments disclosed herein, may be made based on the description set forth herein, without departing from the scope and spirit of the invention as set forth in the following claims.

What is claimed is:

1. A remote monitoring system comprising:
   a monitored computer system including a plurality of monitored computers coupled together by a network;
   stored diagnostic information relating to each of the monitored computers resultant from periodic execution of diagnostic programs stored on computer readable media accessible by each of the monitored computers; and a remote monitoring computer system communicatively coupled to receive the stored diagnostic information from the monitored computers at a programmable periodic interval; wherein one of the monitored computers is a master and others of the monitored computers are slaves, the diagnostic information resulting from execution of the diagnostic programs on the slaves being provided to the master before the diagnostic information is communicated to the remote monitoring system.

2. The monitoring system as recited in claim 1 further comprising storage media in the remote monitoring computer system storing the diagnostic information communicated from the monitored computers over multiple ones of the programmable periodic interval to provide a history of the diagnostic information.

3. The monitoring system as recited in claim 1 wherein one of the monitored computers is a master and others of the monitored computers are slaves, the diagnostic information resulting from execution of the diagnostic programs on the slaves being provided to the master before the diagnostic information is communicated to the remote monitoring system.

4. The monitoring system as recited in claim 1 further comprising an monitor program stored on computer readable media accessible by each of the monitored computers operable to selectively enable and programmably schedule execution of the diagnostic programs on the monitored computers.

5. The monitoring system as recited in claim 1 wherein the remote monitoring computer is communicatively coupled to the monitored system to receive the diagnostic information provided by the monitored system via email.

6. The monitoring system as recited in claim 1 further comprising a secure dial-back modem communicatively coupling the remote monitoring computer to the monitored system.

7. The remote monitoring computer system as recited in claim 1 further comprising software stored in computer readable media accessible to the master and operable to programmably schedule the programmable periodic interval.

8. A method of remotely monitoring a plurality of computers coupled together by a network comprising:

executing diagnostic programs on each of the computers to generate diagnostic results for each of the computers;

collecting the diagnostic results at a storage location accessible by a designated one of the computers; and communicating the diagnostic results of each of the computers, collected at the storage location, to a remote monitoring computer at a programmable interval.

9. The method as recited in claim 8 further comprising:

storing the diagnostic results provided to the remote monitoring computer in a data base to provide searching capability on the diagnostic results; and saving the diagnostic results stored in the data base over multiple ones of the programmable interval to provide a history of the diagnostic results.

10. The method as recited in claim 9 further comprising searching the diagnostic results in the data base according to a timestamp associated with a test.

11. The method as recited in claim 8 further comprising:

programmably setting an execution schedule for each of the diagnostic programs for each of the plurality of computers; and providing the diagnostic results to the outgoing directory during times of low loading on the network.

12. The method as recited in claim 8 wherein the diagnostic results provided at the programmable interval are provided in a secure manner.

13. The method as recited in claim 12 wherein the secure manner includes encryption of the diagnostic results.

14. The method as recited in claim 12 further comprising:

validating that software versions running in the remote monitoring computer system and the designated one computer are correct;

checking a static encryption key stored by the designated one computer;

sending the designated one computer a dynamic session encryption key and encrypting the diagnostic results according to the dynamic encryption key.

15. The method as recited in claim 8 wherein the providing of the diagnostic results to the remote monitoring computer at the programmable interval includes sending the diagnostic results to the monitoring computer via the internet.

16. The method as recited in claim 10 further comprising limiting access for files provided from the remote monitoring computer system to an incoming directory accessible to the master, thereby increasing security of the monitored system.

17. A computer system comprising:

a plurality of monitored computers;

a plurality of groups of diagnostic software modules stored in computer readable media, one of the groups corresponding to and accessible by a respective one of the monitored computers;

a plurality of monitor programs stored in computer readable media accessible respectively to each of the monitored computers, the monitor programs operable to execute and store results of the diagnostic software modules of a respective one of the monitored computers;

an administrator program stored in a computer readable medium operable to provide a graphical user interface to selectively enable the execution of the diagnostic software modules; and a communication software program stored in a computer readable medium operable to provide communication capability between one of the monitored computers and a remote monitoring computer system; wherein the one of the monitored computers is a master and others of the monitored computers are slaves, the results of the diagnostic software modules being provided to the master before being communicated to the remote monitoring computer system.

18. The computer system as recited in claim 17 wherein the administrator program is further operable to schedule execution of the selectively enabled diagnostic tests.

19. The computer system as recited in claim 17 wherein the monitor program is further operable, to configure one of the monitored computers as the master and others of the monitored computers as slaves, and to transfer the results of the diagnostic software modules stored by the monitor programs, from the slaves to the master during a low network load time.

20. The computer system as recited in claim 18 wherein the administrator program is further operable to schedule the master to provide the diagnostic results to a remote computer at fixed intervals.

* * * * *